United States Patent [19]

Moliterni

[11] 4,235,196
[45] Nov. 25, 1980

[54] BIRD FEEDER, CAGE AND BAG ASSEMBLY

[76] Inventor: Samuel S. Moliterni, 8 Washington Ave., Iseline, N.J. 08830

[21] Appl. No.: 7,152

[22] Filed: Jan. 26, 1979

[51] Int. Cl.$^3$ .......................................... A01K 39/04
[52] U.S. Cl. ................................................... 119/18
[58] Field of Search ............... 119/18, 17, 22, 15, 119/51 R, 52 R

[56] References Cited

U.S. PATENT DOCUMENTS

| 2,931,334 | 4/1960 | Hammond | 119/18 |
|---|---|---|---|
| 2,997,022 | 8/1961 | Kay | 119/18 |
| 3,415,226 | 12/1968 | Chevng | 119/18 |
| 3,712,267 | 1/1973 | Moliterni | 119/18 |
| 3,866,576 | 2/1975 | Downing | 119/18 |
| 3,999,519 | 12/1976 | Rodemeyer | 119/18 |

FOREIGN PATENT DOCUMENTS 699920 11/1953 United Kingdom ............... 119/18

Primary Examiner—Jay N. Eskovitz

[57] ABSTRACT

A new design of bird cage, bag and feeder assembly, the cage including a mesh floor so that bird dropings fall therethrough into the bag on the underside of the cage, the bag carrying counterweights on one side balancing the feeder secured to an opposite side of the cage, and the feeder including a dry feed trough and drinking water cup which are automatically refilled by gravity means as consumed, the assembly also including an attachment that clamps to the cage and supports the feeder.

3 Claims, 10 Drawing Figures

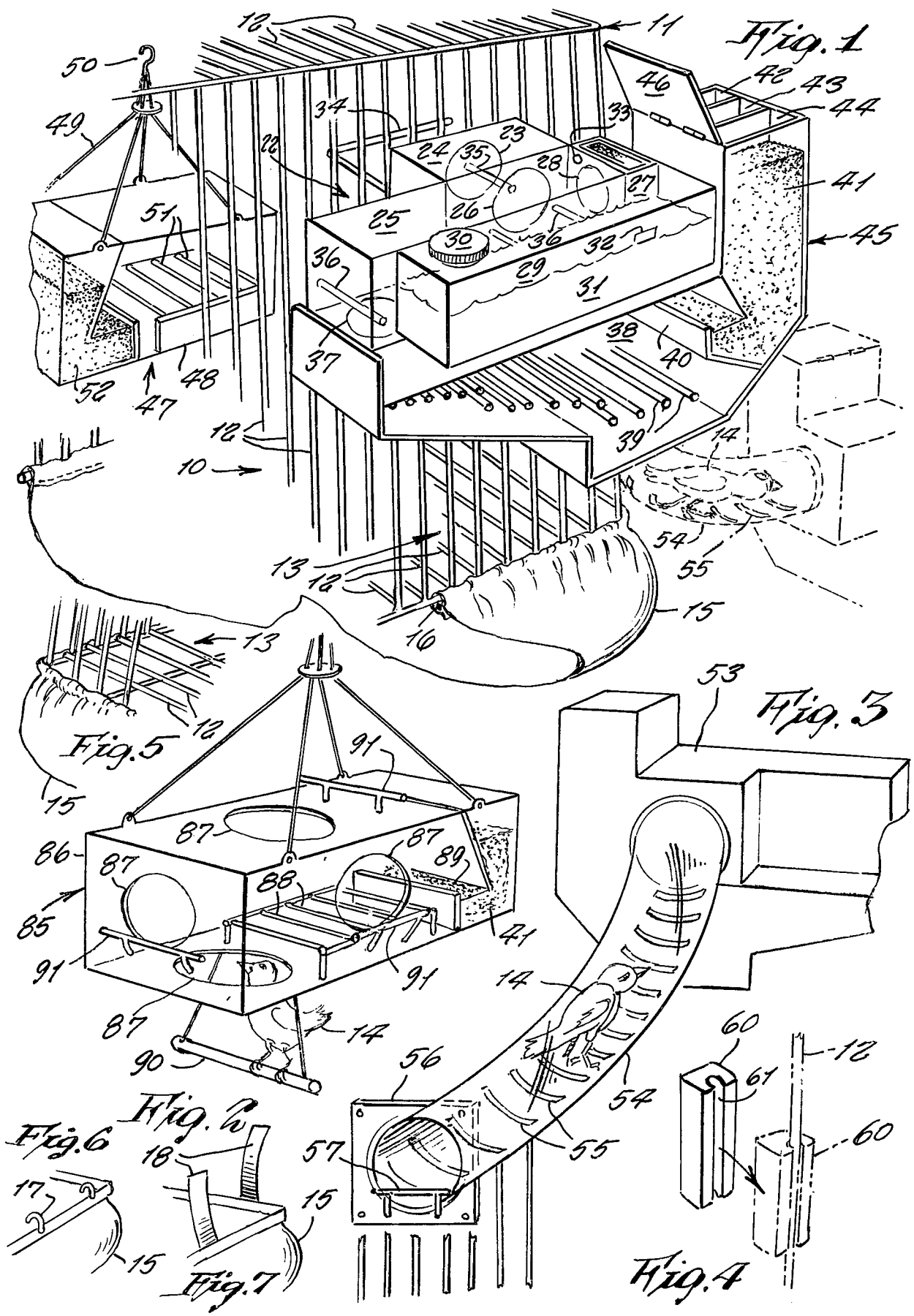

U.S. Patent  Nov. 25, 1980  Sheet 2 of 2  4,235,196
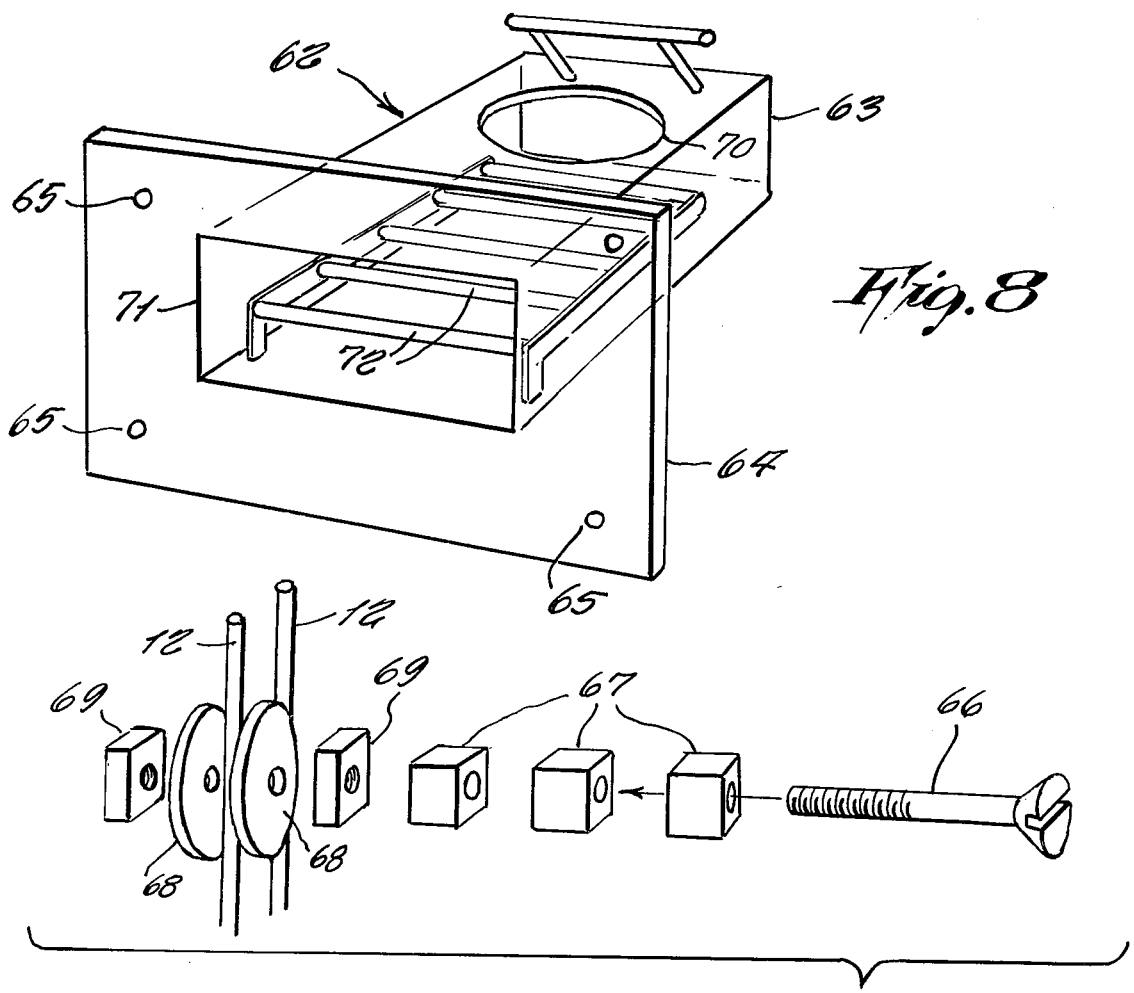
Fig.8
Fig.9
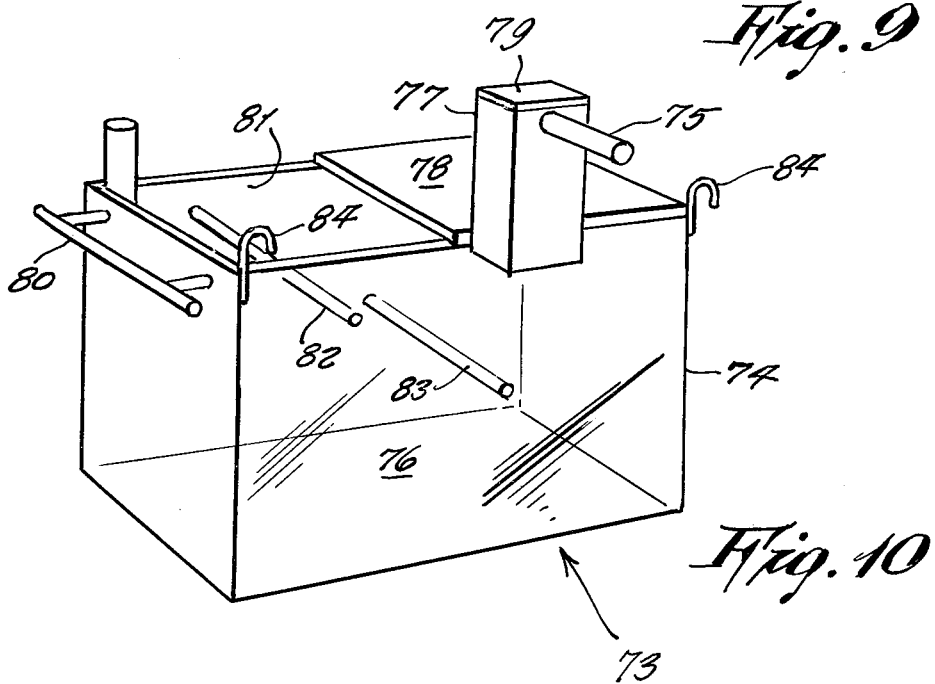
Fig.10

BIRD FEEDER, CAGE AND BAG ASSEMBLY

This invention relates generally to bird cages and feeders therefor.

A principal object of the present invention is to provide a bird feeder and cage assembly in which the feeder is completely automatic in refilling a water drinking cup and a dry feed trough as the same are consumed by birds, so that the birds do not require a daily attention but allow a person to stay away from home for extended periods of time.

Another object is to provide a bird feeder and cage assembly in which a floor of the cage comprises a mesh so that droopings drop therethrough out of the cage so to prevent access thereof for being scratched by birds, thus promoting cleanliness and eliminate bird dieases.

Still another object is to provide a bird feeder, cage and bag assembly wherein the bird droopings drop into an underneath bag that is easier for removal and cleaning than cleaning out a bird occupied cage.

FIG. 1 is a view of one design of the invention units and which includes a design in which an according pleated tube is used between a cage and feeder so when the feeder is placed away from the cage the accordian pleats allows a bird to easily grasp the same so to eliminate need of separate cleats inside the tube, and the design also including pockets on an underside of the net for holding weights.

FIG. 2 shows another design of feeder.

FIG. 3 shows another design of tube.

FIG. 4 shows another design of weights that clip on the cage bars.

FIG. 5 is a fragmentary perspective view of the cage showing a wire mesh floor construction.

FIG. 6 is a detail illustrating attachment of a bag to the cage by means of hooks.

FIG. 7 is a detail illustrating attachment of a bag to a cage by means of tapes.

FIG. 8 is a perspective view of an attachment securable to a cage and which supports the feeder.

FIG. 9 is a detail of a cage clamping mechanism used for supporting the attachment.

FIG. 10 is a perspective view of an emergency overflow water tank.

Referring now to the drawings in greater detail, the reference numeral 10 represents a bird cage and feeder assembly, according to the present invention, wherein there is a cage 11 made of wire bars 12 around its sides and top in a conventional manner, but which additionally includes a mesh 13 of wire bars 12 forming a floor of the cage, so to keep birds 14 inside the cage while bird droopins fall therethrough and into a flexible bag 15 under the cage.

The bag may be made to be either disposable or permanently kept by being replaced after periodic cleaning. It can be made with an elastic band 16 around its edge (as shown in FIG. 1) or else with hooks 17 (as shown in FIG. 6) or tapes 18 (as shown in FIG. 7) for attachment to the cage.

The present assembly includes a bird feeder together with the cage and bag, and different new designs of bird feeders are as follows:

A bird feeder 22 (shown in FIG. 1) may be made of a transparent rigid plastic cage and is attached outside of the cage in front of the cage door opening so a bird can enter the same through an opening 23. It includes a vestitube 24 and compartment 25 entered through opening 26 where a water drinking cup 27 is accessible to the bird by a port 28. A water reservoir tank 29 having a removable refill screw cap 30 contains water 31 that automatically refills the cup when its water level drops below an opening 32 located therebetween. If the tank is overfilled, the overflow water runs out a hole 33 and down into the bag 15. A perch 34 extends from the feeder in front of the opening 23 and perches are located in the vestitube and compartment as shown at 35 and 36.

An opening 37 in one end of a floor of the compartment 25 provides access for the bird to enter a compartment 38 therebelow fitted with a row of perches 39 for travel to a feeding trough 40 into which seeds and other dry feed 41 gravity feeds from separate compartments 42, 43 and 44, or dry feeder 45, and which can be refilled from an outside, by simply lifting up a hinged cover 46.

Another design of feeder 47 (shown in FIG. 1) is suspended inside the cage, and comprises transparent plastic case 48 suspended by chain or cables 49 from a hook 50. It includes an accessible interior fitted with perches 51 and having a dry feeder 52.

In FIG. 3, another design of feeder 53 can be remotely positioned outside and away from a cage, and is attached thereto by a transparent, flexible walk-through tube 54 fitted with cleats 55 so that a bird can walk therethrough. The tube is connected to a plate 56 secured at the cage door opening, and having perch 57 at its entry.

In FIG. 4, a counterweight 60 of a different design from the weights 20, comprises a metal bar having a notch 61 so to snap fit around the cage side bars 12, at any selected position, and which counterbalances the feeder on one side of the cage.

In FIG. 8, an attachment 62 is shown for attachment between a cage and a feeder, and includes a clear plastic case 63 integral with large end plate 64 having holes 65 near each corner for receiving mounting screws 66 for support to a bird cage. One or more spacers 67 may be fitted on the screw for selective placement of the attachment, and the screws are passed between the cage bars 12 (as shown in FIG. 9) and rigidly secured thereto by means of large washers 68 resting against opposite sides of the bars and retained by means of a nut 69 against each washer so to clamp the bars firmly therebetween.

The feeder is supported on the screws 66. The plate 64 covers the cage door opening.

The attachment 62 includes entry openings 70 and 71 at opposite ends thereof and a row of perches 72 therein so a bird can walk therethrough.

In FIG. 10 an emergency overflow water tank is shown which is used only when a person is away from home for an extended length of time, so that the birds are left unattended meantime. It includes a transparent plastic case 74, and a nozzle 75 for attachment into the drain hole 33 so that if the water cup overflows, the water will drain into the tank 76. A filler spout 77 extending upwardly from tank cover 78 is closable on top by a cover 79. In use, a bird perches upon perch 80 and then enters the tank 73 through opening 81 so to perch either upon inner perches 82 or 83 so to drink the water. Hooks 84 on the tank support the tank to a cage.

In FIG. 2, still another design of feeder 85 is shown for placement inside a cage and includes transparent case 86 having entry openings 87 on all sides, top and bottom, the case having a row of perches 88 therewithin and a feed trough 89 for a dry food 41.

A suspended perch 90 under the case allows easy access to the bottom entry opening while perches 91 around the sides and on top allow access to the side entry openings and top opening.

What is claimed:

1. A bird cage comprised of spaced parallel bars in combination with a feeder, having upper and lower levels adapted to be removably attached to said cage, said feeder comprising access means from the cage to said upper level of said feeder which includes a water container having an opening for drinking access, said lower level of said feeder separated from said upper level by a partition having access means for a bird, said lower level including a feeding trough in further combination with a water reservoir in the upper level connected to the water container in still further combination with an enclosed feed storage compartment extending upward from said trough and laterally clearing said container wherein the said opening is dimensioned to prevent full entry of the bird into said water container, said trough having an opening so spaced beneath said partition that the bird can feed therein but cannot enter the trough bodily and wherein the container and reservoir are connected with a hole at level above the container floor to provide automatic refill from said reservoir.

2. The combination of claim 1 in further combination with a flexible tube connecting the cage with a second feeder remotely located said tube having foot hold means for a bird to grasp in order to move to higher or lower elevations.

3. The combination of claim 1 wherein the cage and feeder are secured via a plate, having an access post, and bolts, passing through holes in said plates, including nuts securing said bolts to said cage bars.

* * * * *